(12) United States Patent
Dunn et al.

(10) Patent No.: US 7,293,047 B2
(45) Date of Patent: Nov. 6, 2007

(54) SYNCHRONIZATION VIEW

(75) Inventors: Melissa W. Dunn, Woodinville, WA (US); Oliver G. Fisher, Ottawa (CA); Vivien Park, Seattle, WA (US); Paul Erickson, Sammamish, WA (US); Jon Perlow, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 10/691,905

(22) Filed: Oct. 23, 2003

(65) Prior Publication Data

US 2005/0091592 A1   Apr. 28, 2005

(51) Int. Cl.
*G06F 17/00* (2006.01)

(52) U.S. Cl. .................. 707/204; 707/203; 707/102; 707/101

(58) Field of Classification Search ............... 707/204, 707/203, 102
See application file for complete search history.

(56) References Cited

U.S. PATENT DOCUMENTS

2004/0253945 A1\* 12/2004 Janik .................... 455/419
2005/0149487 A1\* 7/2005 Celik ....................... 707/1

\* cited by examiner

*Primary Examiner*—Sana Al-Hashemi
(74) *Attorney, Agent, or Firm*—Banner & Witcoff, Ltd.

(57) ABSTRACT

Systems and methods are disclosed for synchronizing data stored in remote stores. Data stored in locations such as computer applications, consumer electronic devices and Internet websites is synchronized with a central database within a computer device. The computer device may also store constraints that limit the type of data that may be synchronized with individual stores. A graphical user interface may use different formats or icons to distinguish between data stored in a store and data included within the central database.

9 Claims, 6 Drawing Sheets

SYNCHRONIZATION VIEW

FIELD OF THE INVENTION

Aspects of the present invention relate to synchronization systems and graphical user interfaces. More specifically, aspects of the present invention provide synchronization systems and graphical user interfaces that allow users to synchronize data and determine which elements of a group of elements are synchronized with a given store.

BACKGROUND

Computer devices are increasingly being used to store contact data. It is not uncommon for a user to store contact data in devices and locations such as mobile phones, personal digital assistants (PDAs), laptop computers and servers connected to the Internet. Synchronization applications have been developed to help users synchronize contact data stored in different locations. For example, after updating a phone number stored in a mobile telephone, a particular synchronization application may be used to synchronize the updated phone number with contact data stored in an application such as Microsoft® Outlook®.

There are several drawbacks associated with the prior art systems and methods for synchronizing contact data. Each device typically requires a unique synchronization application in order to synchronize data with another device and location. A mobile telephone might require a first synchronization application to synchronize data with Microsoft® Outlook®, a second synchronization application to synchronize data with a PDA and may be incapable of synchronizing data with a server connected to the Internet. As a result, users are typically forced to implement inconvenient and ad hoc procedures for updating contact information stored in different devices and locations. These procedures can be burdensome and frequently result in the synchronization of less than all of a user's contact data.

Therefore, there is a need in the art for synchronization systems and methods that allow users to conveniently and accurately synchronize contact and other data stored in different devices and locations.

BRIEF SUMMARY

Aspects of the present invention address one or more of the issues mentioned above, thereby providing systems and methods that allow for the convenient and accurate synchronization of data. Stores are synchronized with publisher records that may be included within the operating system of a computer device. The data in publisher records may be aggregated and synchronized with composite records that may also be included within the operating system. A graphical user interface may use different formats or icons to distinguish between data included within a publisher record and data included only within the composite record.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
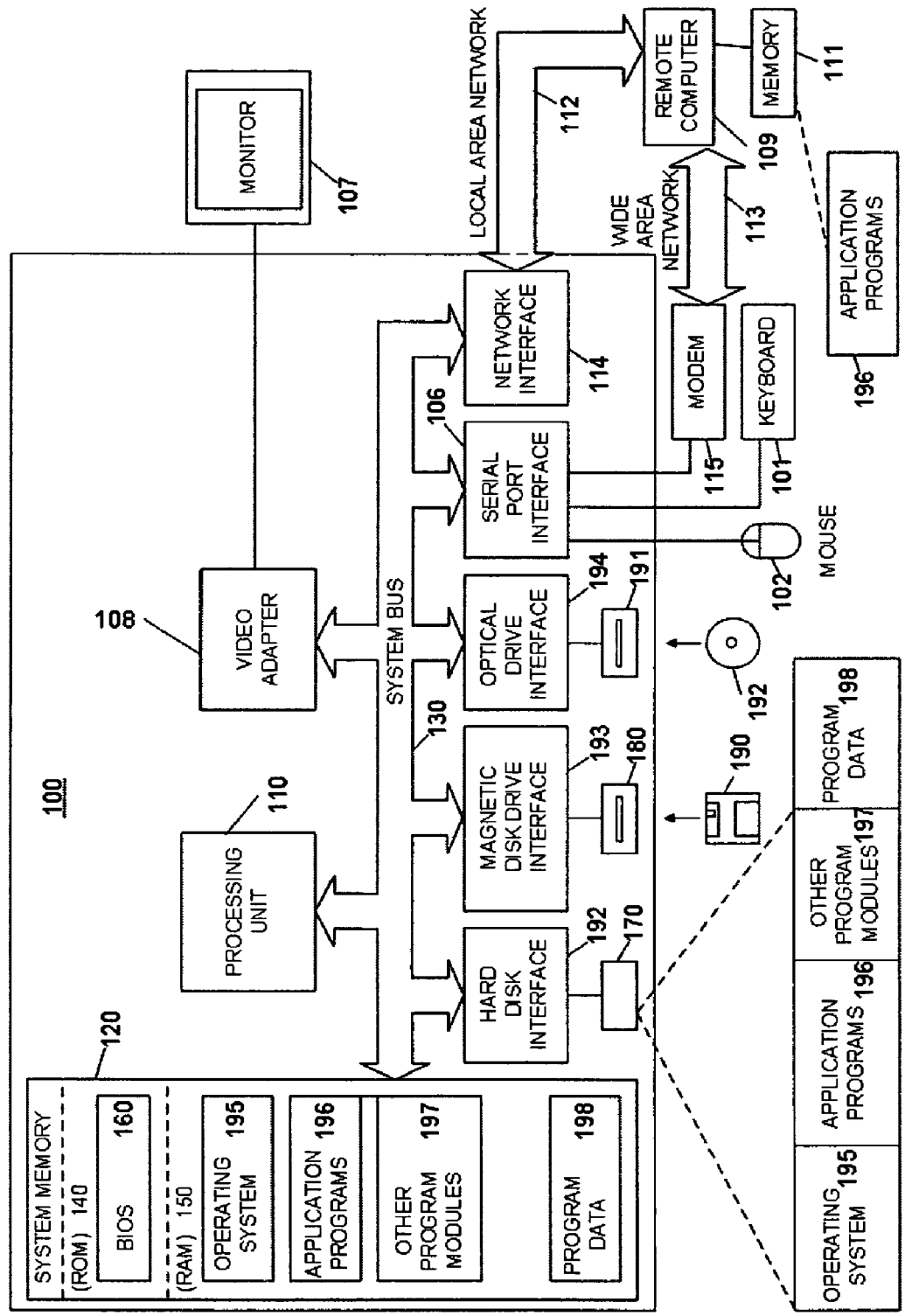
FIG. 1 shows a functional block diagram of a conventional general-purpose computer system.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
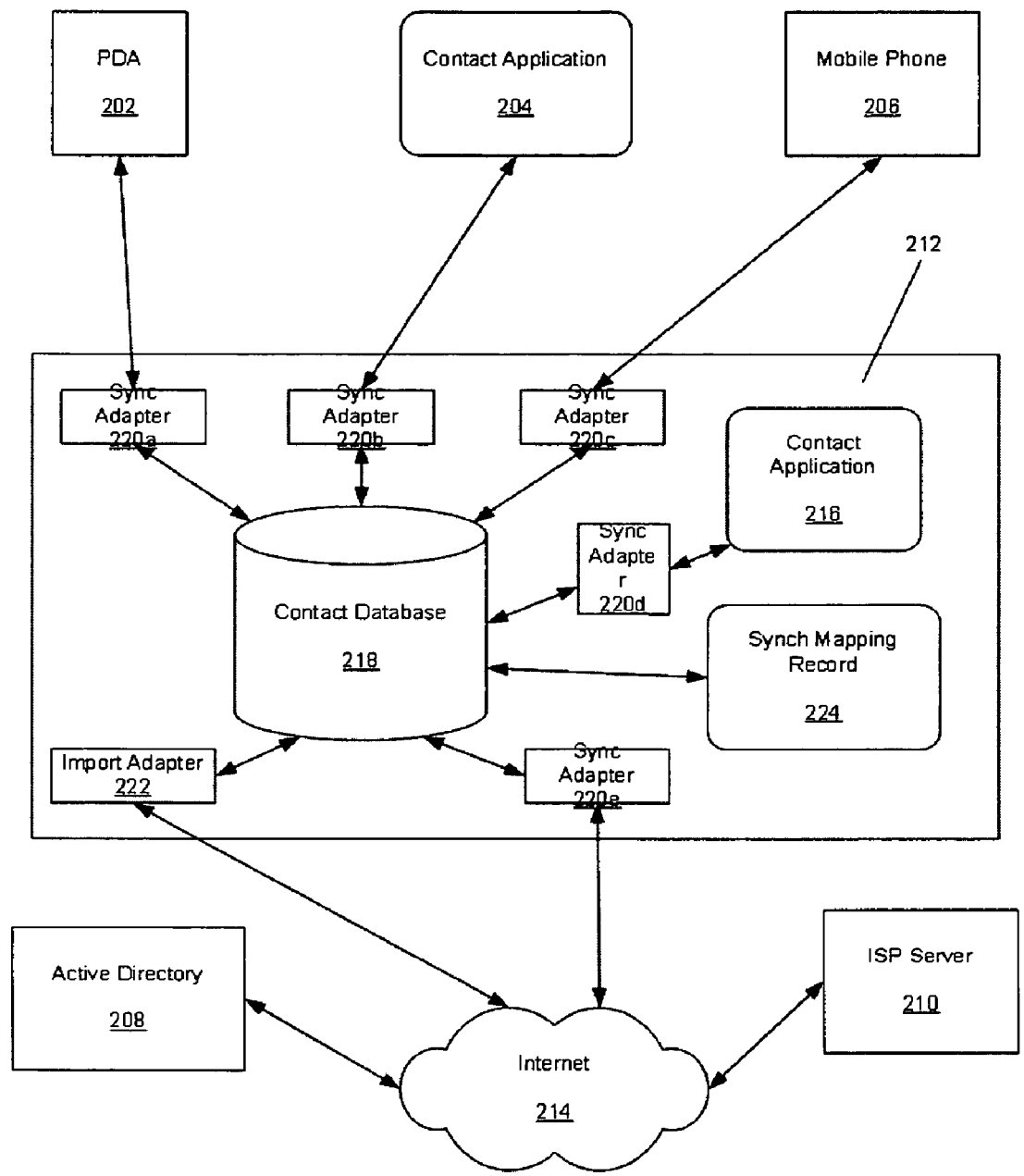
FIG. 2 illustrates a system for synchronizing data stored in a plurality of stores in accordance with an embodiment of the invention.

FIG. 2 illustrates a system 200 for synchronizing data stored in a plurality of stores in accordance with an embodiment of the invention. As used herein, a store may be in the form of a device or a file that may be accessed by an application. System 200 includes remote stores implemented with a personal digital assistant 202, a contact application 204, a mobile phone 206, Active Directory 208 and Internet service provider server 210. Remote stores 202, 204 and 206 may be connected directly to a computer device 212. The connections may be via one or more docking cradles, USB cables, infrared link or any other conventional mechanism used to connect a device to a computer device. Remote stores 208 and 210 may be connected to computer device 212 via the Internet 214. Computer device 212 may include one or more internal stores, such as contact application 216. In one embodiment, contact application 216 is implemented with Microsoft® Outlook®. One skilled in the art will appreciate that the aspects of the invention are not limited to the stores and data connections shown in FIG. 2.

Computer device 212 includes a contact database 218 for storing contact information. Contact information may include names, addresses, phone numbers, email addresses, instant messenger identifications, etc. In alternative embodiments of the invention, contact database 218 may also store other data, such as digital certificates, passwords, playlists, data files or any other data that a user wishes to synchronize with a store. Moreover, the function of the single database 218 may be performed with two or more databases. For example, a first database may store contact data and a second database may store playlists.

A plurality of synchronization adapters 220a-220e are used to synchronize data stored in contact database 218 and stores 202, 204, 206, 210 and 216. One skilled in the art will appreciate that structure of any particular synchronization adapter may be a function of the type of store and an application programming interface (API) that is used to access data stored in contact database 218. One or more stores may be configured to not allow a user to manage data stored in that store. Active Directory 208, for example, allows users to read data, but not to write data. Active Directory 208 may be connected to computer device 212 via an important adapter 222. Important adapter 222 is used to transfer data from Active Directory 208 to contact database 218.

A synchronization mapping record 224 may include rules, constraints or other information that governs the synchronization of data. For example, if mobile phone 206 only allows a user to store two phone numbers per name, a constraint in synchronization mapping record 224 may prevent more than two phone numbers per name from attempting to be synchronized with the data stored in mobile phone 206.

Figure 3:
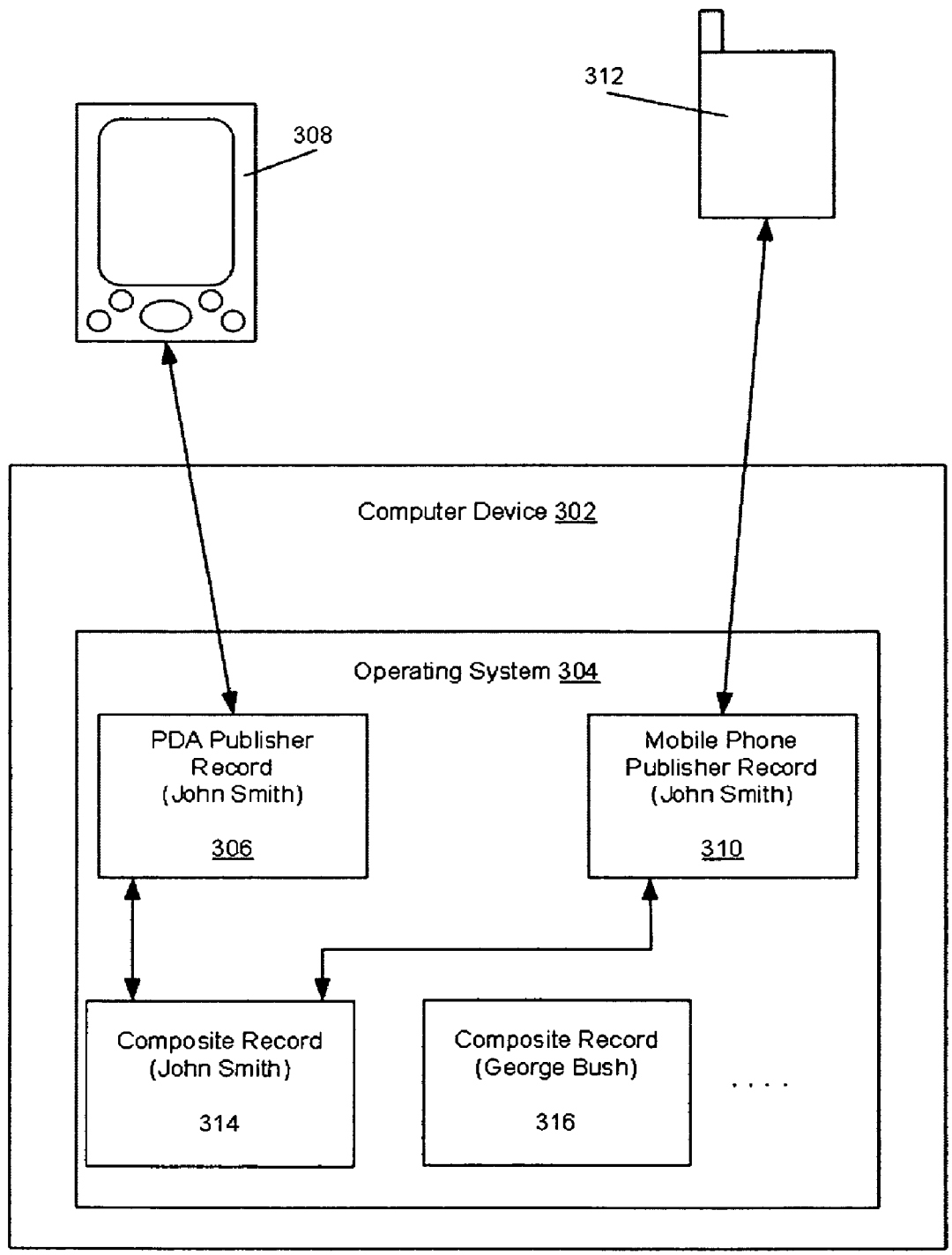
FIG. 3 illustrates a system that may be used to synchronize data with two stores and a database, in accordance with an embodiment of the invention.

FIG. 3 illustrates a system that may be used to synchronize data with two stores and a database, in accordance with an embodiment of the invention. A computer device 302 may be similar to computer device 212. Computer device 302 includes an operating system 304. A PDA publisher record 306 includes data that is synchronized with a PDA 308. A mobile phone publisher record 310 includes information that is synchronized with a mobile phone 312. PDA publisher record 306 and mobile phone publisher record 310 each synchronize with one or more composite records, such as composite records 314 and 316. Publisher records 306 and 310 and composite records 314 and 316 may be included within contact database 218 (shown in FIG. 2).

In an illustrative implementation, PDA publisher record 306, mobile phone publisher record 310 and composite record 314 may each include contact data for John Smith. A user may update John Smith's contact information stored in PDA 308. Synchronizing with computer device 302 causes PDA publisher record 306 to include the updated contact information. The updated contact information is then synchronized with composite record 314. Composite record 314 may then be synchronized with mobile phone publisher record 310. The next time that mobile phone 312 is synchronized with computer device 302, the data stored in mobile phone 312 is synchronized with mobile phone publisher record 310. Of course, composite record 314 may be synchronized with a plurality of additional publisher records, which will lead to the synchronization of data stored in additional stores.

In the embodiment shown in FIG. 3, records 306, 310, 314 and 316 are shown located within operating system 304. One of the advantages of locating the records within an operating system is that the number of APIs required to update data stored in several different stores can be minimized. In one embodiment of the invention, a single API is used to manage the data stored within publisher records, such as PDA publisher record 306 and mobile phone publisher record 310. This is in contrast to prior art systems in which a given store might be required to use one API for synchronizing data with data stored in a first application, a second API for synchronizing data with data stored in a second application, and so on.

Figure 4:
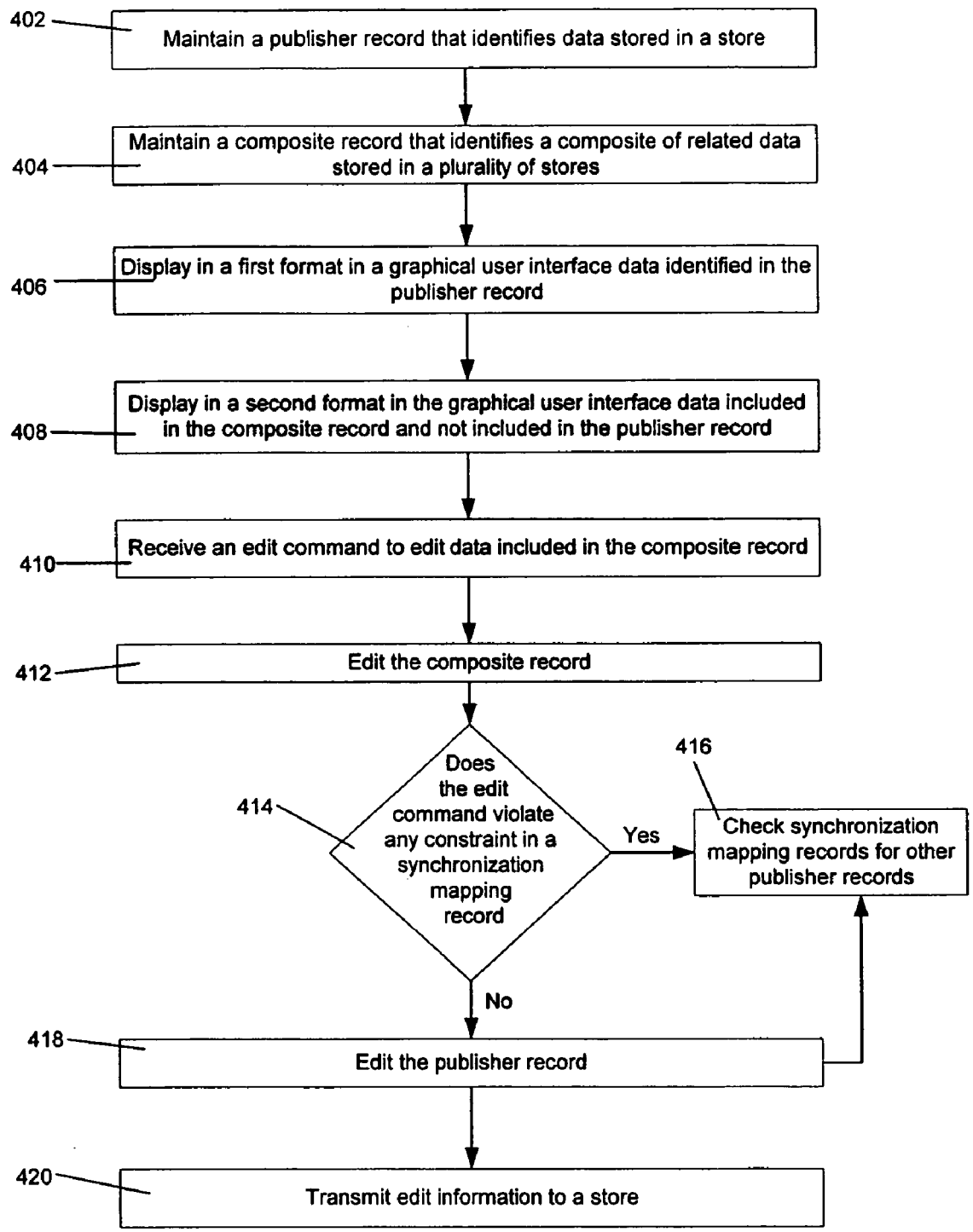
FIG. 4 illustrates a method for synchronizing data stored in stores, in accordance with an embodiment of the invention.
Figure 5:
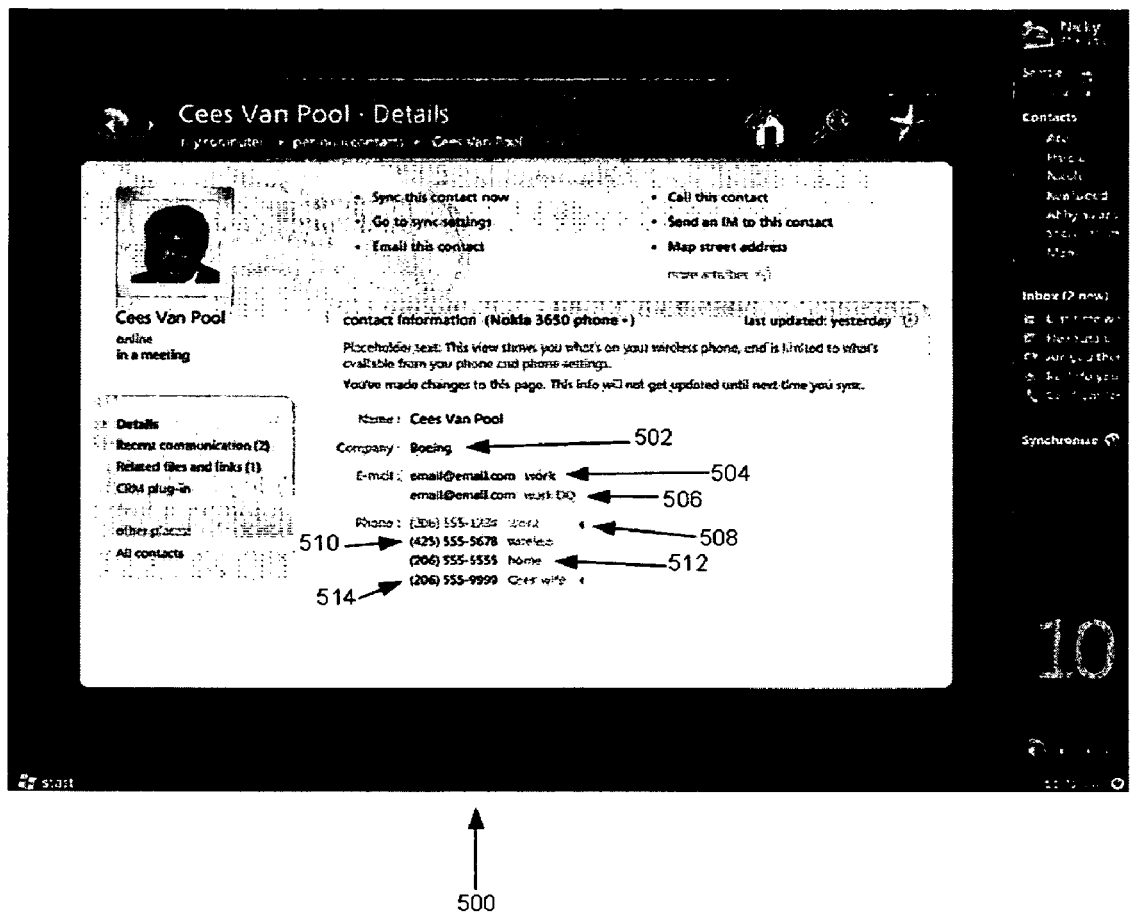
FIG. 5 illustrates a graphical user interface corresponding to a mobile phone publisher record.

FIG. 4 illustrates a method for synchronizing data stored in stores, in accordance with an embodiment of the invention. In step 402, at least one publisher record that identifies data stored in a store is maintained. As used herein, maintaining a record means creating, modifying, updating or otherwise changing the record. A publisher record may be maintained, for example, by synchronizing the data in the publisher record with data stored in a corresponding mobile phone. In step 404, a composite record that identifies a composite of data stored in the plurality of stores is maintained. Step 406 includes displaying, in a first format in a graphical user interface, data identified in the publisher record. FIG. 5 illustrates a graphical user interface 500 corresponding to a mobile phone publisher record. Graphical user interface 500 includes contact information for a person named Cees Van Pool. Fields 502, 504, 506, 510, 512 and 514 are included in the publisher record and displayed in a normal format.

Step 408 includes displaying, in a second format in the graphical user interface, data included in the composite record and not included in the publisher record. Field 508 is included in the composite record and not in the publisher record and is accordingly displayed in a faded format. The fields included in the composite record that are not included in a publisher record may be a function of the corresponding store. The mobile phone referred to in field 516, for example, may be configured to only store three phone numbers per person. A variety of other formats may be used to indicate which fields are included within a composite record and not a publisher record. In one alternative embodiment, one or more icons may be used to distinguish the relevant fields.

Figure 6:
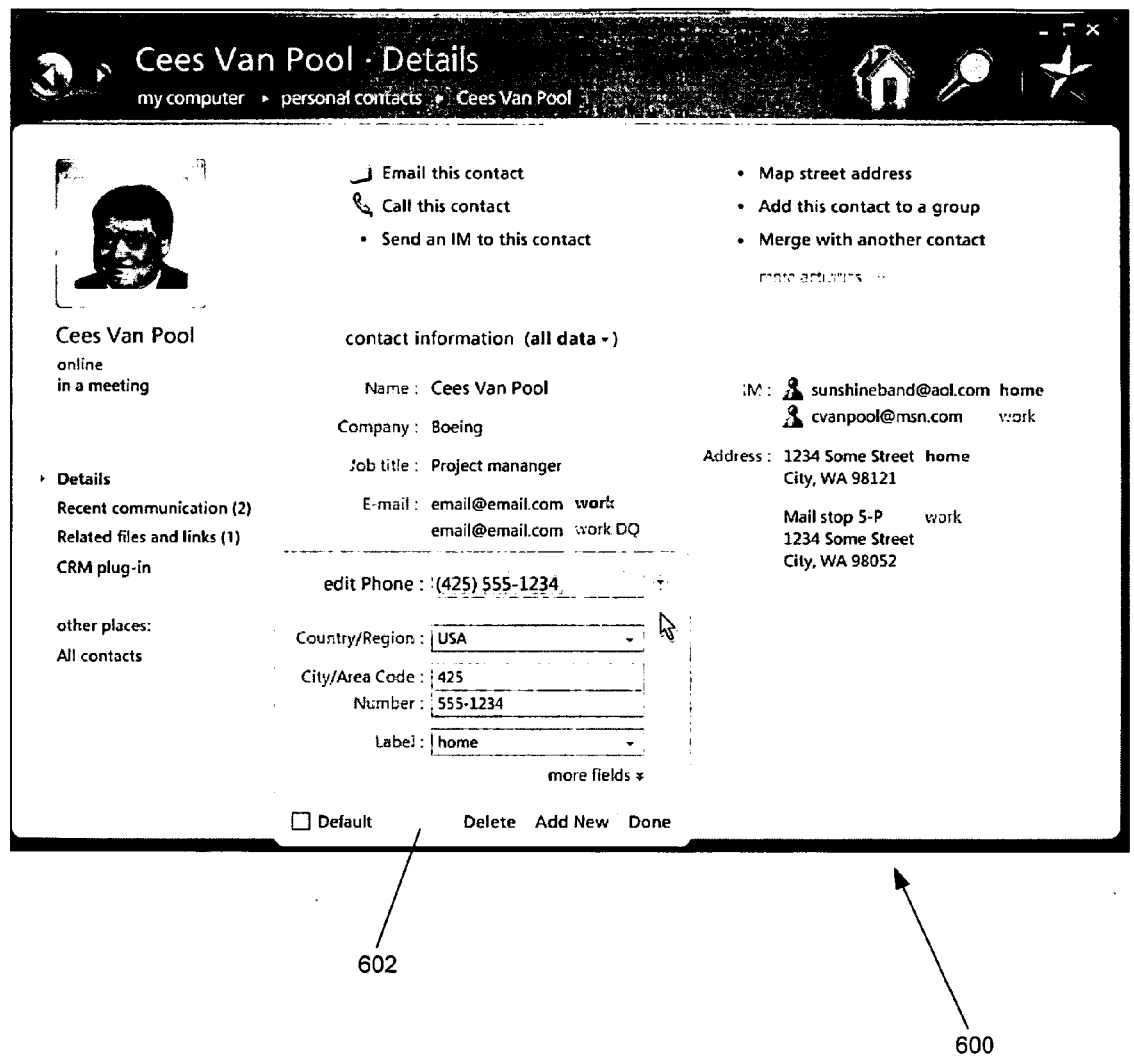
FIG. 6 illustrates a graphical user interface that includes a dialogue box that may be used to edit a composite record, in accordance with an embodiment of the invention.

An edit command to edit data included in a composite record is received in step 410. The edit command may be received at a computer operating system. FIG. 6 illustrates a graphical user interface 600 that includes a dialogue box 602 that may be used to edit a composite record. In response to receiving the edit command, in step 412, the edit is made to the composite record. After an edit is performed to a composite record, edits may need to be performed to one or more publisher records. A table may identify publisher records that are linked to a composite record. In step 414 is it determined whether the edit command violates any constraint in a synchronization mapping record. An edit command may include adding an additional phone number and a synchronization mapping record may include a constraint that limits the number of phone numbers that may be included in a publisher record and a corresponding store.

When a constraint would be violated, synchronization mapping records for other publisher records may be checked in step 416. For example, after determining that a mobile phone synchronization mapping record prevents the addition of another phone number, the system may then analyze a PDA synchronization mapping record to determine if the number may be added to a PDA publisher record. This process may be repeated for every publisher record.

When a constraint would not be violated, the publisher record is edited in step 418. After step 418, control may transfer to step 416 and the edit information may be transferred to a store in step 420. Edit information may include an entire new record. For example, when the third phone number in a record is changed, the edit information transferred to a store may include an entire new record that includes modifications to the third phone number. Edit information may alternatively only include the information that is necessary to make the change. With reference to the example given above, edit information may include the identification of the third phone number and the necessary changes, such as information indicating that the last digit in the third phone number should be changed to "4." One skilled in the art will appreciate that edit information may take a variety of different forms.

The present invention has been described in terms of preferred and exemplary embodiments thereof. Numerous other embodiments, modifications and variations within the scope and spirit of the appended claims will occur to persons of ordinary skill in the art from a review of this disclosure. For example, one or more of the disclosed methods may be wholly or partially implemented with computer-executable instructions recorded on at least one computer-readable medium.

We claim:

1. A method of synchronizing data stored in remote stores, the method comprising:
    (a) connecting a first remote store to a computer device;
    (b) synchronizing data stored within the first remote store with data contained within a first publisher record stored within the computer device;
    (c) synchronizing the data contained within first publisher record with data contained within a composite record stored on the computer device;
    (d) synchronizing the data contained within composite record with data contained within a second publisher record stored within the computer device.

2. The method of claim 1, further including:
    (e) synchronizing the data contained within second publisher record with data stored within a second remote store.

3. The method of claim 1, further including:
    (e) receiving a command from a user to edit the data contained within the composite record; and
    (f) comparing the edit command to at least one constraint in a synchronization mapping record corresponding to the first remote store;
    (g) editing the first publisher record when the edit command does not violate the at least one constraint.

4. The method of claim 1, wherein the composite record is part of a computer operating system.

5. The method of claim 1, wherein the data contained within the first publisher record comprises contact data.

6. The method of claim 1, wherein the data contained within the second publisher record comprises contact data.

7. The method of claim 1, wherein the data contained within the first publisher record comprises calendar data.

8. The method of claim 1, wherein the data contained within the first publisher record comprises playlist data.

9. The method of claim 1, wherein the data contained within the first publisher record comprises digital certificate.

* * * * *